United States Patent [19]
Yoshikawa et al.

[11] Patent Number: 5,255,113
[45] Date of Patent: Oct. 19, 1993

[54] POS-OBJECTIVE TYPE OPTICAL SCANNER

[75] Inventors: Motonobu Yoshikawa, Nishinomiya; Yoshiharu Yamamoto, Toyonaka, both of Japan

[73] Assignee: Matsushita Electric Industrial Co., Ltd., Osaka, Japan

[21] Appl. No.: 856,642

[22] Filed: Mar. 24, 1992

[30] Foreign Application Priority Data

Apr. 3, 1991 [JP] Japan ................................ 3-070961

[51] Int. Cl.$^5$ ............................................ G02B 26/08
[52] U.S. Cl. ................................ 359/196; 359/207; 359/216
[58] Field of Search ............... 359/196, 205, 206, 207, 359/216, 217, 218, 219

[56] References Cited

U.S. PATENT DOCUMENTS 4,674,825 6/1987 Tateoka et al. .................... 359/218

FOREIGN PATENT DOCUMENTS 0286368 10/1988 European Pat. Off. .
2917221 11/1979 Fed. Rep. of Germany .
59-154403 9/1984 Japan .
59-216122 12/1984 Japan .
61-254915 11/1986 Japan .
1-109317 4/1989 Japan .

Primary Examiner—Loha Ben
Attorney, Agent, or Firm—Stevens, Davis, Miller & Mosher

[57] ABSTRACT

A post objective type optical scanner for having a light source for emitting a light beam having a first width in the scanning direction and a second width in the sub-scanning direction, a single lens having an incident surface and an emergent surface and including a scanning optical system having a first light source side principal point, and a sub-scanning optical system having a second light source side principal point, for converting a light beam emitted from the light source having a scanningwise width and a subscanningwise width, the scanning optical system converting the first width of the light beam into the scanningwise of the scanning beam while the sub-scanning optical system converting the second width of the light beam into the subscanningwise width of the scanning beam. The distance of the first light source side principal point from the light source is greater than the distance of the second light source side principal point from the light source. The incident surface of the single lens is toric, having an aberration correction surface for the sub-scanning optical system, while the emergent surface is toric or cylindrical, having an aberration correction surface for the sub-scanning optical system.

5 Claims, 6 Drawing Sheets

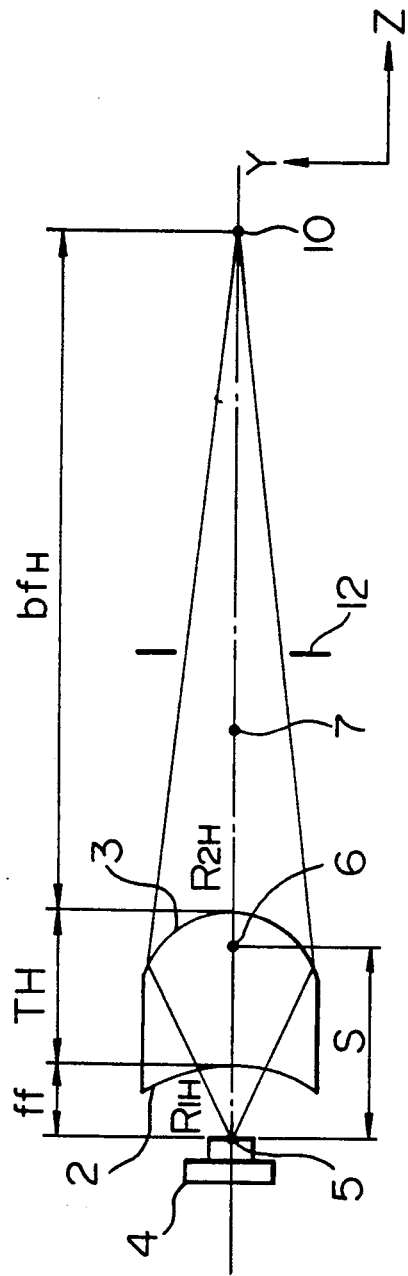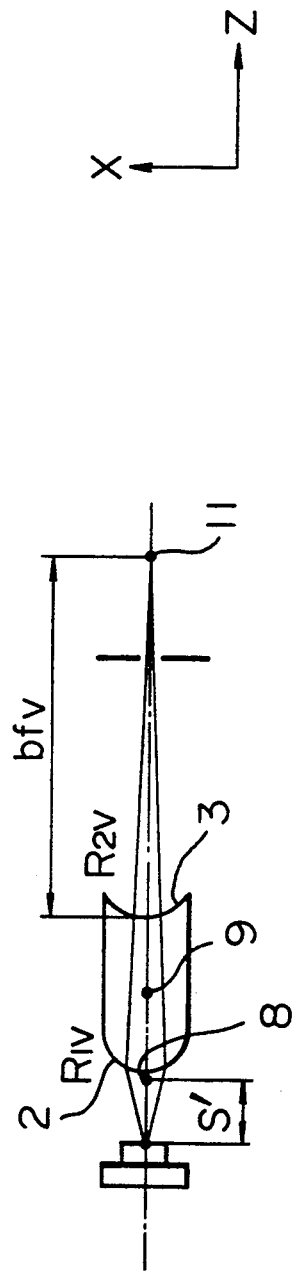

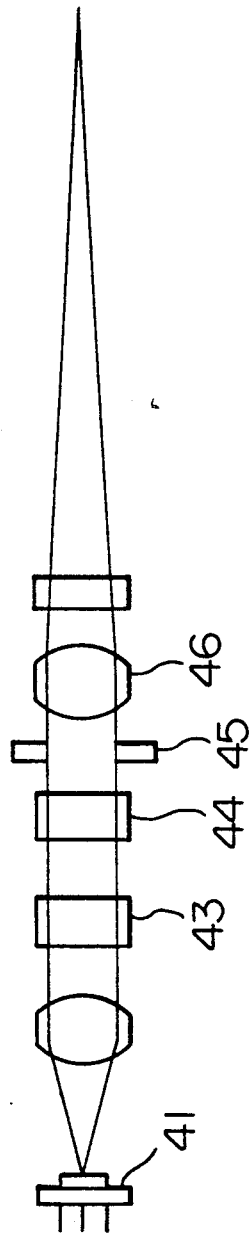
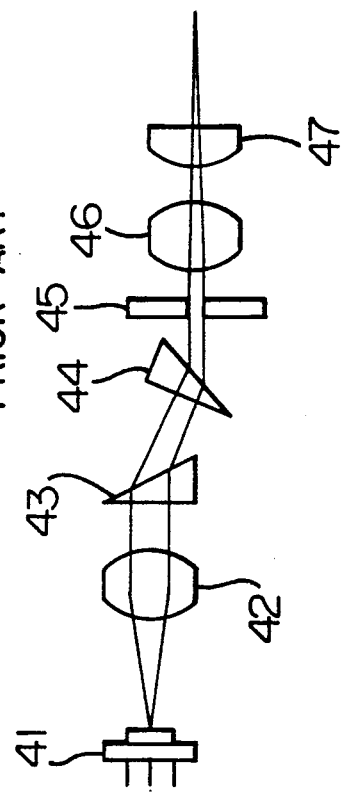
FIG. 6a PRIOR ART
FIG. 6b PRIOR ART

POS-OBJECTIVE TYPE OPTICAL SCANNER

BACKGROUND OF THE INVENTION

1. Field of the Invention

The present invention relates to an optical scanning system and, more particularly, to a post-objective type optical scanner in which a laser beam converted into a pencil of rays is deflected by a polygonal mirror. Still more particularly, the present invention is concerned with a post-objective type optical scanner which utilizes an anamorphic single lens.

2. Description of the Related Art

Post-objective type optical scanners employ a laser beam source which emits a pencil of rays and a polygonal mirror which deflects the pencil of rays. Because of compact construction and low costs of production, this type of optical scanner has been studied, developed and put to commercial production in recent years.

In general, an optical scanner has a main scanning optical system which conducts scanning in the direction of the major axis of an elliptical cross-section of a beam from a laser diode, and a sub-scanning optical system which performs scanning in the direction of the minor axis of the elliptical cross-section.

In a post-objective type optical scanner of the present invention, the focal distance of the main scanning optical system is more than 10 times as large as that of the sub-scanning optical system. Therefore, in order to equalize the dimensions of the beam spot on the image surface both in the directions of main scan and sub-scan, it is necessary that the aperture stop disposed on the incident side of the polygonal mirror has a rectangular or an elliptical form which is 10:1 or greater in terms of the ratio between the width as measured in the direction of main scan and the width as measured in the direction of sub-scan. For this reason, a mere collimation of a semiconductor laser beam does not provide a required level of rate of utilization of light. A solution to this problem is to use prisms. FIG. 5 illustrates an optical scanner which uses prisms. This optical scanner has a semiconductor laser 41, a collimator lens 42, prisms 43, 44, an aperture stop 45, a convergent lens 46, a cylindrical lens 47, a mirror 48, a polygonal mirror 49 having cylindrical surfaces, a compensating lens 50, and a photosensitive drum 51. As will be seen from FIGS. 6a and 6b, the laser beam from the semiconductor laser 41, which is disposed such that the direction of greatest divergence angle of beam coincides with the direction of main scan, is changed into a collimated beam having an elliptical intensity distribution of about 3:1 in terms of the ratio between the size in the direction of main scan and the size in the direction of sub-scan. The beam is then transmitted through prisms 43, 44 which are arranged to contract the beam spot size only in the direction of sub-scan, so that the beam is changed into a collimated beam having an elliptical form of intensity distribution of about 10:1 in terms of the ratio between major and minor-axes. The beam then impinges upon the cylindrical lens 47 through the aperture stop 45 and the convergent lens 46.

A lens which plays the double role of a collimator lens and prisms, intended for use in optical disk systems, has been disclosed in Japanese Patent Unexamined Publication No. 61-254915.

The use of prisms, however, is disadvantageous in that the cost is raised and the size of the system inevitably is large due to intricacy of arrangement of optical components. The lens shown in Japanese Patent Unexamined Publication No. 61-254915 also has drawbacks in that it exhibits relatively large residual spherical aberration because its surfaces are toric surfaces which are represented simply by radii of curvature, and in that this lens does not offer any advantage when applied to a post-objective type optical scanner since it is a lens intended for changing a beam having a flattened cross-section into a circular cross-section.

SUMMARY OF THE INVENTION

Accordingly, an object of the present invention is to provide a post-objective type optical scanner employing an integral anamorphic single lens which can play the roles of the collimator lens, a pair of prisms and the cylindrical lens of the optical system explained before in connection with FIG. 5, that is which can eliminate the necessity of these several components.

The anamorphic single lens of the present invention is constructed to comprise a main scanning optical system and a sub-scanning optical system which have different magnitudes of refractive power in main and sub-scanning directions, respectively, so as to change a beam from a beam source having different angles of beam divergence in the main and sub-scanning directions into a collimated beam, a convergent beam or a divergent beam. Representing the distance between the beam source and the incident-side principal position of the main scanning optical system by S, and the distance between the beam source and the incident-side principal point of the sub-scanning optical system by S', the above-mentioned single lens is determined to meet the condition of $S > S'$.

In view of the preferred embodiment of the present invention, the first surface, i.e., the incident surface of this single lens is a toric surface which is concave in the direction of the main scan and convex in the direction of the sub-scan and which has terms of development of quartic and higher orders contributing to aberration correction only in the direction of the sub-scan. The second surface, i.e., the emergent surface, of this single lens is a toric surface convex in the direction of the main scan, or a cylindrical surface, having terms of development of quartic and higher orders contributing to aberration correction only in the direction of the main scan. The radii of curvatures of the incident and emergent lens surfaces in each scanning direction, as well as the higher-order developed terms, are determined in accordance with factors such as the rate of utilization of light required for the whole optical system, imaging positions in both scanning directions and an optical performance to be attained.

Thus, the radii of curvatures of the lens surfaces in each scanning direction are determined to meet requirements for the rate of utilization of light and the imaging position in each scanning direction, while satisfying the above-mentioned condition of $S > S'$. As the emergent side of this single lens, a light beam is wide-spread or diverged in the direction of main scan and contracted or converged in the direction of sub-scan, thereby obtaining an intensity distribution of an elliptical form which has a major axis in the direction of the main scan, thus improving the rate of utilization of light. At the same time, the beam can be focused correctly at a required imaging position through the whole optical system.

In the single lens used in the present invention, as stated before, the first surface as the incident surface of this single lens is a toric surface which is concave in the direction of the main scan and convex in the direction of the sub-scan and which has terms of development of quartic or higher orders contributing to aberration correction only in the direction of the sub-scan, whereas, the second surface, i.e., the emergent surface, is a toric surface convex in the direction of the main scan, or a cylindrical surface, having terms of development of quartic or higher orders contributing to aberration correction only in the direction of the main scan. With these features, this single lens can cope with demands for optical performance to be attained by the whole optical system.

Furthermore, by using the anamorphic single lens having the above-described features, it is possible to realize an inexpensive and compact optical scanner.

Therefore, a post-objective type optical scanner, employing such anamorphic single lens, when employed in an image forming apparatus, reduces the size and cost of such image forming apparatus.

BRIEF DESCRIPTION OF THE DRAWINGS

FIG. 2a is a top plan view of an optical system employing the anamorphic single lens shown in FIG. 1;

FIG. 2b is a side elevational view of the optical system shown in FIG. 2a;

FIG. 6a is a top plan view of the conventional optical scanner shown in FIG. 5; and FIG. 6b is a side elevational view of the optical scanner shown in FIG. 6a.

DESCRIPTION OF THE PREFERRED EMBODIMENTS

A preferred embodiment of the present invention will be described with reference to the accompanying drawings.

Figure 1:
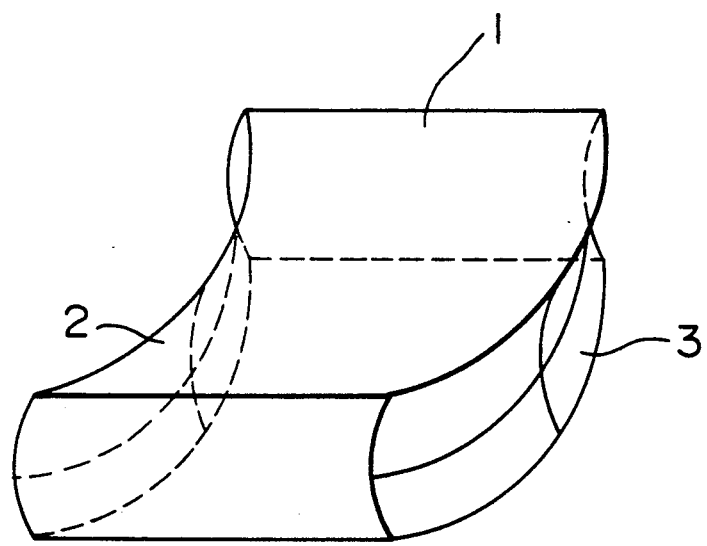
FIG. 1 is a perspective view of an example of anamorphic single lens used in an embodiment of a post-objective type optical scanner in accordance with the present invention.

FIG. 1 shows an anamorphic single lens suitable for use in a post-objective type optical scanner of the present invention. The single lens 1 has a first surface 2 adjacent to a light source, i.e., an incident surface, and a second surface 3 adjacent to an image plane, i.e., an emergent surface.

This single lens is designed and formed so as to have a main-scanning optical system and a sub-scanning optical system. The main scanning optical system is provided by specific radii of curvatures of lens surfaces as shown in FIG. 2a and converges as incident beam in the manner shown in the same Figure. The sub-scanning optical system is provided by specific radii of curvatures of lens surfaces as shown in FIG. 2b and converges an incident beam in the manner shown in the same Figure. The optical arrangement shown in FIGS. 2a and 2b has, in addition to the anamorphic single lens 1, a semiconductor laser 4 and an elliptical aperture stop 12. Numeral 5 denotes a laser emitting point as the object point, 6 denotes the position of the incident-side principal point of the main scanning optical system, 7 denotes the position of the imaging-side principal point of the main scanning system, 8 denotes the position of the incident-side principal point of the sub-scanning system, and 9 denotes the position of the imaging-side principal point of the sub-scanning system. Numerals 10 and 11 respectively indicate the focal positions of the main and sub-scanning systems.

The first surface 2 of the anamorphic lens 1 is curved at a radius $R_{1H}$ in the direction of the main scan and at a radius $R_{1V}$ in the direction of the sub-scan. This surface is a toric surface which has developed terms of quartic and higher orders which contribute to correction of aberration only in the sub-scanning direction. The second surface 3 of the anamorphic lens 1 is curved at a radius $R_{2H}$ in the direction of the main scan and at a radius $R_{2V}$ in the direction of the sub-scan. This surface is a toric surface which has developed terms of quartic and higher orders which contribute to correction of aberration only in the main scanning direction The geometries of these toric surfaces, in terms of amounts of sag from the apices of the toric surfaces, are represented by the following developed equations (1) and (2) based on an X-Y-Z coordinate system as shown in FIGS. 2a and 2b.

Similarly, geometries of the second surface is expressed by the equations (3) and (4).

$$Z = f(X) + \frac{1}{2} \cdot \frac{1}{R_{1H}} \{X^2 + Y^2 - f^2(X)\} \quad \text{Equation 1}$$

$$f(X) = \frac{\frac{X^2}{R_{1V}}}{1 + \left\{1 - (1 + K_V)\left(\frac{X}{R_{1V}}\right)^2\right\}^{\frac{1}{2}}} + \quad \text{Equation 2}$$

$$A_V \cdot X^4 + B_V \cdot X^6 + C_V \cdot X^8 + D_V \cdot X^{10}$$

$$Z = f(Y) + \frac{1}{2} \cdot \frac{1}{R_{2V}} \{X^2 + Y^2 - f^2(Y)\} \quad \text{Equation 3}$$

$$f(Y) = \frac{\frac{Y^2}{R_{2H}}}{1 + \left\{1 - (1 + K_H)\left(\frac{Y}{R_{2H}}\right)^2\right\}^{\frac{1}{2}}} + \quad \text{Equation 4}$$

$$A_H \cdot Y^4 + B_H \cdot Y^6 + C_H \cdot Y^8 + D_H \cdot Y^{10}$$

In the higher-order developed equation for aberration correction in the main scanning direction, $K_H$ represents a conic coefficient, and $A_H$, $B_H$, $C_H$ and $D_H$ represent coefficients of higher orders. In the higher-order developed equation for aberration correction in the sub-scanning direction, $K_V$ represents a conic coefficient, and $A_V$, $B_V$, $C_V$ and $D_V$ represent coefficients of higher orders.

Referring to FIGS. 2a and 2b, the distance between the laser emission point 5 and the position 6 of the incident-side principal point of the main scanning system is represented by S, and the distance between the laser emission point 5 and the position 8 of the incident-side principal point of the sub-scanning system is represented by S'. The central lens thickness is expressed by TH. The distance between the laser emission point 5 and the first surface is expressed by ff. The distance between the focal position 10 of the main scanning optical system and the second surface is represented by $bf_H$, and the distance between the focal position 11 of the sub-scanning optical system and the second surface is represented by $bf_V$. Practical numerical values of these factors are shown in Tables 1, 2, 3 and 4. The design wavelength is 788 nm, while the vitreous material is SF 8.

TABLE 1

| | | | | | |
|---|---|---|---|---|---|
| $R_{1H}$ | −2.7029 | $R_{1V}$ | 2.2453 | TH | 8 |
| $R_{2H}$ | −4.3146 | $R_{2V}$ | 25.0385 | ff | 3.77 |
| $K_H$ | −3.97930E − 01 | $K_V$ | −7.34099E − 01 | | |
| $A_H$ | 2.18881E − 05 | $A_V$ | −1.78496E − 02 | | |
| $B_H$ | 7.03154E − 07 | $B_V$ | −7.66638E − 04 | | |
| $C_H$ | −1.89559E − 08 | $C_V$ | 1.67513E − 02 | | |
| $D_H$ | 1.34658E − 09 | $D_V$ | −1.75090E − 02 | | |
| S | 11.82 | S' | 3.36 | | |
| $bf_H$ | 137.2659 | $bf_V$ | 70 | | |

TABLE 2

| | | | | | |
|---|---|---|---|---|---|
| $R_{1H}$ | −3.2096 | $R_{1V}$ | 2.2351 | TH | 9 |
| $R_{2H}$ | −4.7433 | $R_{2V}$ | 54.8385 | ff | 3.6 |
| $K_H$ | −4.04325E − 01 | $K_V$ | −2.47634E + 00 | | |
| $A_H$ | 1.48856E − 05 | $A_V$ | −1.23479E − 04 | | |
| $B_H$ | 3.57869E − 07 | $B_V$ | −2.88800E − 03 | | |
| $C_H$ | −1.01931E − 08 | $C_V$ | 3.19496E − 03 | | |
| $D_H$ | 4.03148E − 10 | $D_V$ | 1.15544E − 01 | | |
| S | 11.88 | S' | 3.39 | | |
| $bf_H$ | 137.2659 | $bf_V$ | 70 | | |

TABLE 3

| | | | | | |
|---|---|---|---|---|---|
| $R_{1H}$ | −3.3324 | $R_{1V}$ | 2.1351 | TH | 10 |
| $R_{2H}$ | −5.0391 | $R_{2V}$ | −57.8469 | ff | 3.2 |
| $K_H$ | −4.07125E − 01 | $K_V$ | −2.68763E + 00 | | |
| $A_H$ | 1.28650E − 05 | $A_V$ | −8.50962E − 04 | | |
| $B_H$ | 3.99698E − 07 | $B_V$ | −5.21152E − 03 | | |
| $C_H$ | −1.68494E − 08 | $C_V$ | 7.76519E − 03 | | |
| $D_H$ | 5.20370E − 10 | $D_V$ | 3.25931E − 01 | | |
| S | 11.80 | S' | 3.43 | | |
| $bf_H$ | 137.2659 | $bf_V$ | 70 | | |

TABLE 4

| | | | | | |
|---|---|---|---|---|---|
| $R_{1H}$ | −2.5949 | $R_{1V}$ | 1.8181 | TH | 11 |
| $R_{2H}$ | −5.1168 | $R_{2V}$ | −13.1981 | ff | 2.39 |
| $K_H$ | −4.07660E − 01 | $K_V$ | −3.19308E + 00 | | |
| $A_H$ | 1.30857E − 05 | $A_V$ | −3.38390E − 03 | | |
| $B_H$ | 3.54225E − 07 | $B_V$ | −2.01399E − 02 | | |
| $C_H$ | −1.45443E − 08 | $C_V$ | 1.83038E − 02 | | |
| $D_H$ | 4.74867E − 10 | $D_V$ | 4.37069E + 00 | | |
| S | 11.36 | S' | 3.52 | | |
| $bf_H$ | 137.2659 | $bf_V$ | 70 | | |

The effect of the anamorphic lens having these features will be described with reference to FIGS. 1 and 2a and 2b.

Referring to FIGS. 2a and 2b, a semiconductor laser 4 is disposed such that the greater divergence angle coincides with the direction of the main scan. The divergence angle of beam in the main scanning direction is expressed by a (deg), while the divergence angle of beam in the sub-scanning direction is represented by b (deg). Thus, the condition of a>b is met. In such a case, the laser beam which is going to impinge upon the lens has an elliptical intensity distribution which is expressed by tan (a/2):tan (b/2) in terms of the ratio between the size in the main scanning direction and the size in the sub-scanning direction. The beam from the semiconductor laser 4, when passing through the first surface of the lens which is concave in the main scanning direction, is diverged in the main scanning direction and is converged by the second surface of the lens which is convex in the main scanning direction, so as to be focused on the focal position 10 demanded by the whole scanning system. The beam is converged in the sub-scanning direction by the first surface of the lens as it passes through the first surface which is convex in the sub-scanning direction and is further converged by the second surface of the lens so as to be focused at the focal position 11 demanded by the whole optical system. The intensity distribution of the beam immediately after emerging from the lens is expressed by the ratio md:sd, where md corresponds to the size in the main scanning direction and sd corresponds to the size in the sub-scanning direction.

As stated above, the sizes md and sd are respectively represented as follows:

$$md = \tan(a/2) \times S$$

$$sd = \tan(b/2) \times S'$$

Assuming that the aforementioned beam sizes a and b are respectively given by a=30 and b=10 in the case of the example given in Table 1, the values md and sd are respectively calculated as md=3.17 and sd=0.29. When the condition S>S' is met, it is possible to obtain an elliptical intensity distribution pattern which is further elongated in the main scanning direction to a major-to-minor axis ratio at about 11:1. Consequently, loss of light which is caused when the beam passes through the elliptical aperture stop 12 is considerably reduced, so that a rate of utilization of light which is demanded by the whole scanning optical system can be obtained. This advantageous effect is obtainable also with other examples shown in Tables 2 to 4.

The spherical aberration in the main scanning direction has been corrected by the second surface of the lens, while the spherical aberration in the sub-scanning direction has been corrected by the first surface of the lens.

The operation of the optical scanner of the invention will be described with reference to FIGS. 3 and 4.

Figure 3:
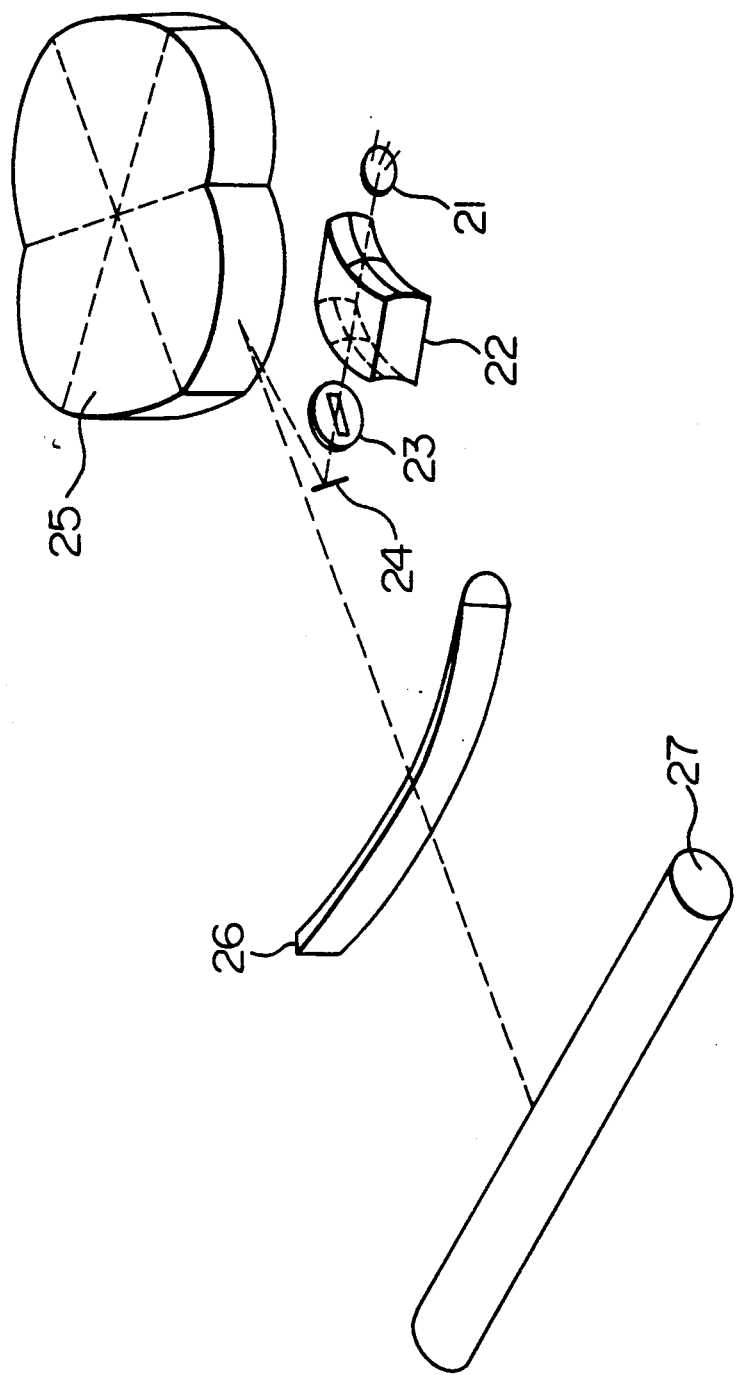
FIG. 3 is a perspective view of an embodiment of the post-objective type optical scanner of the present invention.

FIG. 3 is an illustration of an optical scanner employing the anamorphic single lens described hereinbefore. Referring to this figure, the light beam from a semiconductor laser 21 is made to pass through the anamorphic single lens which is in this case denoted by 22, so as to be changed into a beam having an elliptical intensity distribution pattern, while being converged in the main scanning direction. The beam then passes through an elliptical aperture stop 23 and, after being reflected by a mirror 24, is converged in the sub-scanning direction in a region near to one of cylindrical reflection surfaces of the polygonal mirror 25. The polygonal mirror 25 rotates about its axis so as to deflect the light impinging thereon. The deflected light is then focused on the surface of a photosensitive drum through a compensating lens 26 thereby to scan the surface of the photosensitive drum 27 with a simultaneous correction of curvature of field in the main scanning direction. The compensating lens 26 is disposed in such a manner as to provide a conjugate opto-geometrical relation between the point of deflection and the scanned point on the photosensitive drum 27 in the sub-scanning direction, thereby effecting correction of any tilt of surface of the cylindrical polygonal mirror. At the same time, the refractive power of the compensating lens 26 in the sub-scanning direction is progressively decreased in the direction of main scan from the center towards the peripheral region of this lens, thereby to effect a correction of curvature of field in the sub-scanning direction. Correction of $f\theta$ characteristic can be effected by converting electrical clock in the signal output into the scanning position.

According to the present invention, it is possible to obtain a post-objective type optical scanner which is small in size, low in price and excellent in resolution, by virtue of the use of the above-described anamorphic single lens together with a compensating lens and a polygonal mirror having cylindrical surfaces.

Figure 4:
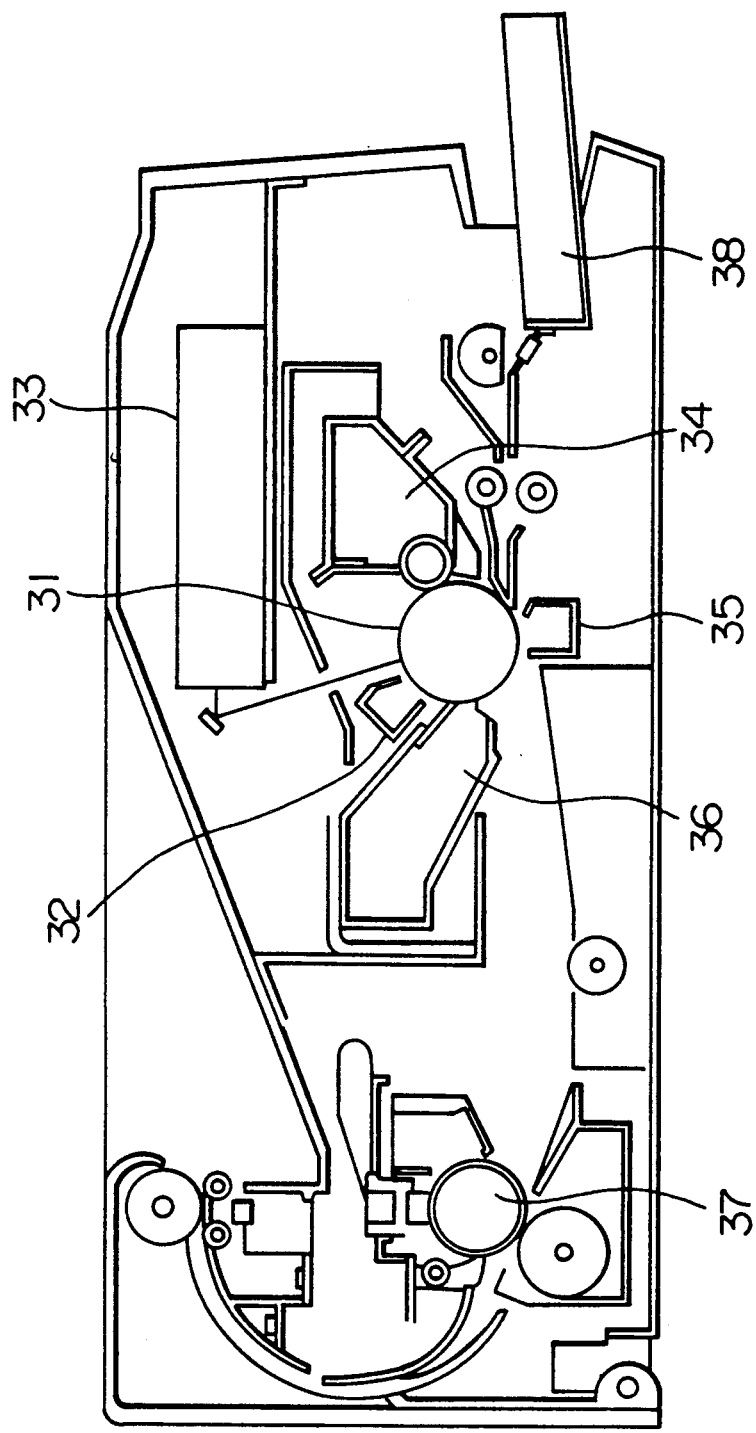
FIG. 4 is an illustration of an image forming apparatus incorporating the optical scanner of the present invention.
Figure 5:
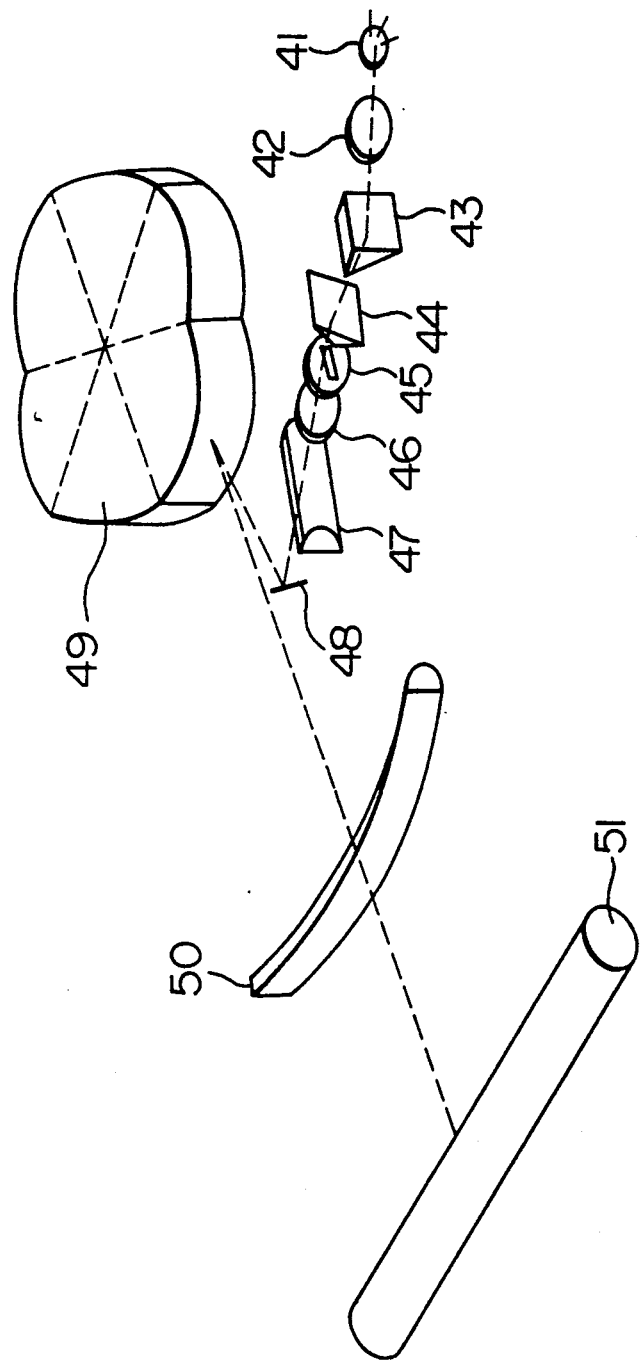
FIG. 5 is an illustration of a conventional optical scanner.

FIG. 4 shows an image forming apparatus which incorporates the post-objective type optical scanner embodying the present invention. Referring to this Figure, the image forming apparatus has the following components: a photosensitive drum 31 on which the states of charge are changeable upon irradiation with a light beam; a primary charger which deposits electrostatic ions on the surface of the photosensitive drum 31 so as to uniformly charge the drum surface; an optical scanner which is of the same type as the described embodiment and adapted for writing information in the form of electrostatic latent image on the surface of the photosensitive drum 31; a developing unit 34 for developing the latent image by depositing charged toner; a transfer charger 35 for transferring the toner image from the surface of the photosensitive drum 31 to a sheet of paper; a cleaner 36 for removing any residual toner from the drum surface; a fixing unit 37 for fixing the transferred toner image onto the paper; and a sheet feeder cassette 38.

It will be seen that, by using the post-objective type optical scanner of the invention, it is possible to obtain a small-sized and inexpensive image forming apparatus.

What we claim is:

1. A post-objective type optical scanner comprising:
   a light source for emitting a light beam having a first width in a scanning direction and a second width in a sub-scanning direction;
   a single lens having a light source side incident surface and an image plane side emergent surface, for converting said light beam into a scanning beam having a scanningwise width in said scanning direction and a subscanningwise width in said subscanning direction, said single lens comprising a scanning optical system having a first light source side principal point, for converting said first width into said scanningwise width, and a sub-scanning optical system having a second light source side principal point, for converting said second width into said subscanningwise width; whereby the distance of said first light source side principal point to said light source is greater than the distance of said second light source side principal point to said light source;
   a means for scanning said scanning beam from said single lens on a scanning plane; and
   a correction lens arranged between said means for scanning and said scanning plane and having a sub-scanning focal distance which varies in said scanning direction from the center to each of both side ends of said correction lens, for focusing said scanning beam onto said scanning plane.

2. An optical scanner as set forth in claim 1, wherein said incident surface is a first toric surface which is concave in said scanning direction but convex in said sub-scanning direction, and said emergent surface is a second toric surface which is convex in said sub-scanning direction.

3. An optical scanner as set forth in claim 2, wherein said first toric surface has an aberration correcting surface for said sub-scanning optical system, and said second toric surface has an aberration correcting surface for said scanning optical system.

4. An optical scanner as set forth in claim 3, wherein each of said aberration correcting surfaces is defined by a series expansion including a member having an order higher than a biquadratic order.

5. An optical scanner as set forth in claim 1, wherein said means for scanning includes a deflector comprising a deflecting surface which is cylindrical.

* * * * *